UNITED STATES PATENT OFFICE 2,454,351

PRODUCTION OF ALICYCLIC CARBOXYLIC ACIDS

Frank J. Sowa, Cranford, N. J., and Arthur Schwerdle, New York, N. Y.; said Schwerdle assignor to said Sowa No Drawing. Application May 15, 1946, Serial No. 670,018

14 Claims. (Cl. 260—514)

This application is a continuation in part of copending application Serial No. 588,424, filed April 14, 1945.

Our invention relates to methods for conducting reactions between conjugated dienes and 1,2 unsaturated carboxylic acids and derivatives of such acids containing at least one free carboxyl group. Reactions of this character are well known and take place vigorously resulting in the formation of addition products which are generally mono- or polycyclic substances. Heretofore such reactions have generally been carried out in the presence of a hydrocarbon or other organic solvent. However, the patent to Hopff et al. No. 2,262,002 indicates that reactions of this character may be carried out in an aqueous medium provided suitable dispersing agents are employed for establishing an intimate contact between the reactants. The reaction conducted in accordance with the Hopff et al. patent requires from 10 to 12 hours for completion but the patent states that the water present serves to effect the withdrawal of the heat of reaction and reduces the tendency for side reactions to occur. As a result the reaction product formed is substantially pure and a higher yield is obtained.

We have discovered that reactions between conjugated dienes and 1,2 unsaturated carboxylic acids and their derivatives containing a free carboxyl group can be carried out in an aqueous medium or in the presence of polar solvents and can be carried to completion in a matter of a relatively few minutes and without using any dispersing agents, provided the pH concentration of the aqueous medium is maintained low and has a value below 7 and preferably below about 5. Our work indicates that the hydrogen ion promotes the reaction and is largely, if not wholly, responsible for the speeding up and completion of the reaction in aqueous media.

Copending application Serial No. 588,424 is directed particularly to methods for treating waste liquors containing maleic acid or other unsaturated organic compounds, whereas the present invention relates generally to methods whereby conjugated dienes are reacted with 1,2 unsaturated carboxylic acids in the presence of a polar solvent and while maintaining the pH value below 7 and preferably below about 5.

The principal object of our invention is to provide novel methods for conducting reactions between conjugated dienes and 1,2 unsaturated carboxylic acids in the presence of a polar solvent.

Another object of our invention is to provide methods whereby reactions between conjugated dienes and 1,2 unsaturated carboxylic acids may be carried out quickly and in a manner to obtain substantially quantitive yields of relatively pure products.

A particular object of our invention is to provide methods for conducting such reactions wherein the pH value is maintained below 7 and preferably below about 5.

These and other objects and features of our invention will appear from the following description thereof wherein reference is made to specific examples which have been cited for the purpose of indicating the nature of our invention but without intending to limit the scope of our invention thereby.

Processes which can be carried out in accordance with our invention may be generally represented by the following equations:

A. 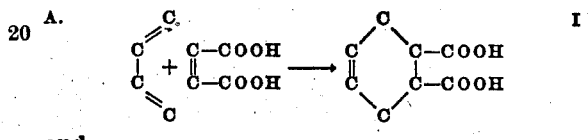

and

B. 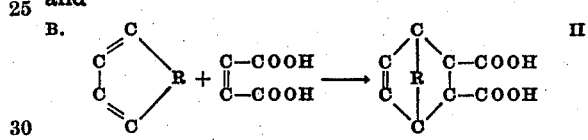

where R is —C—, —C—C—,

and —O—. In place of the maleic acid shown in the foregoing equations there may be used any 1,2 unsaturated organic acid compounds as a class, and including the mono-salts and esters of dicarboxylic acids, dicarboxylic acids as a class, such, for example, as maleic, itaconic, citraconic, mesaconic acids and the like, and their halogen derivatives; also acrylic acid, water-soluble esters of acrylic acid and the like. Further by way of illustration the process is described in said copending application as employed in the treatment of aqueous waste liquors containing low concentration of maleic acid, in particular, the liquor resulting from the production of phthalic anhydride by oxidation. The reaction in general appears to take place when using any organic acid or compound having a free carboxyl group attached to the molecule of a 1,2 unsaturated group. All compounds of this type are herein referred to as 1,2 unsaturated carboxylic acids.

Further, the reaction is general in that the conjugated diene employed in the process may be any conjugated alicyclic (homocyclic) diene as a class such, for example, as cyclopentadiene-1,3; 1,3,5,5-tetramethyl cyclohexadiene-1,3 and the like; also oxygen-heterocyclic 1,3, dienes as a class such, for example, as furan, furoic acid, cumalin, 2-methyl cumalin, sylvan (2-methyl furan) and the like; also aliphatic dienes as a class such, for example, as butadiene, isoprene, cyclohexadiene 1,3, alpha phellandrene and the like. The diene does not have to be in the pure state but may be present in organic or inorganic mixtures or organic liquids and may itself be a waste material.

Although the conjugated dienes are organic substances which are, in general, immiscible with water, they will react with the unsaturated compounds in the presence of a polar solvent such as water, alcohol and various aqueous waste liquors. The reaction is facilitated by agitation, stirring or other intimate admixture, although in some cases a sufficient reaction occurs by merely bubbling the diene through the aqueous liquor. Elevated temperatures up to the boiling point of the waste liquor are effective in initiating the reaction but are not essential, and by placing the mixture under pressures greater than atmospheric, for example, up to 5 atmospheres, the reaction is facilitated. In general, the diene is used in a mole equivalent of the unsaturated compound in the aqueous medium, but preferably the diene is used in a slight excess of the theoretical amount.

The mixing of the diene with the aqueous liquid is facilitated by the presence of a small amount, e. g. from 0.1% to 5% of a wetting agent in the reaction mixture. However, this is not necessary and in many commercial applications it is not even desirable. When a surface tension depressant is employed it is preferable to add it to the aqueous liquor before bringing the diene into contact therewith. Suitable agents are, for example, sulfonated fatty acids, sulfated fatty alcohols, e. g. "Tergitol," ethylene oxide condensates of higher alcohols, e. g. "Emulfor-O," Turkey-red oil and the like. As an alternative, the conjugated water-immiscible diene may be first emulsified with a small quantity e. g. from 2-20 times the weight of the diene of water (using a part of the polar solvent, water or waste liquor if desired). The emulsion is then added to the body of the solution containing the unsaturated carboxylic acid or to waste liquor to obtain an intimate mixing. Suitable emulsifying agents used for this purpose are, for example, soluble soaps, methyl cellulose, glue, gelatine and the like which may be used with wetting agents.

The products resulting from the reactions described may be considered to be alicyclic compounds because they contain only one double bond and the other carbons of the ring are saturated. Referring to the typical equations cited above, the alicyclic acid I is obtained when the diene is aliphatic and the acid designated II is produced when the diene used is cyclic. The acids thus obtained may be used per se or converted into the corresponding anhydrides, monoacid esters, and di-esters, or converted by thermal decomposition back into maleic acid or the other unsaturated carboxylic acid employed in the reaction for use in the chemical and industrial arts.

The reactions are exothermic and result in substantially quantitive yields of relatively pure products. However, the speed of the reaction in the presence of a polar solvent or aqueous medium is dependent upon the hydrogen ion concentration of the medium in which the reaction is carried out. This is evident from the fact that the change in speed of reaction with change in the hydrogen ion concentration follows very closely the change in hydrogen ion concentration on titration of an aqueous solution of the unsaturated acid employed in forming the reaction product. Thus in conducting reactions between maleic acid and cyclopentadiene in an aqueous solution having a pH value of 0.71 the formation of the precipitate is substantially instantaneous. A similar solution to which sodium bicarbonate has been added until the pH value is 1.8 requires approximately 10 minutes to initiate the reaction and requires approximately 90 minutes for completion of the reaction during which time the pH value rose to 4.28. Reactions in which the initial pH value is 6.0 take place so slowly as to be scarcely observable after vigorous shaking for ½ hour while reactions in which the pH value is 9.5 gave no indication of reaction whatever after vigorous shaking for 2 hours.

Moreover, it has been found that the neutral salts of maleic acid such, for example, as disodium maleate, wherein both —COOH groups thereof have been reacted, do not react in non-alkaline polar type solvent media with the dienes of the class described. Such dienes react only with said mono- and polycarboxylic acids and compounds wherein there is at least one unsubstituted —COOH group attached to the molecule of the 1,2 unsaturated group and in the presence of an aqueous medium or polar solvent they react only within a non-alkaline pH range of not over 7.0.

The term "polar type solvent" as employed herein is used in its ordinary sense; i. e., that type of solvent which will conduct a current when an ionizable compound is placed in the solvent. Polar type solvents are often termed "oxygenated solvents" because they ordinarily have oxygen present in the molecule, and comprise such solvents as water, alcohols, ethers, esters and the like. In contrast, non-polar type solvents, such, for example, as hydrocarbons as gasoline, kerosene, naphtha; also aromatic organic solvents such as benzene, toluene, and the like, do not conduct an electric current when an ionizable compound is placed therein. A diene of the class described, such as cyclopentadiene, will not react with the maleic acid in a non-polar type solvent media because the maleic acid does not ionize in such solution.

By way of illustrating the present invention but not by way of limitation there will be given the following examples:

*Example I*

50 grams of maleic anhydride were introduced into a vessel containing 750 cc. of methyl alcohol at room temperature. No catalyst was present. A slow even reaction immediately took place between the alcohol and the maleic anhydride. There was thus formed a monomethyl ester of maleic acid in an excess of alcohol. After reaction had been completed the solution had a pH value of 2.1. To this solution there was added 55 grams of cyclopentadiene whereupon reaction took place promptly forming the addition compound having the formula:

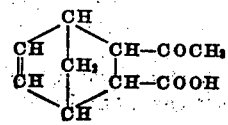

This addition product was easily separated from the alcoholic solution by distilling off the methanol.

Alternatively, the excess methanol may be permitted to remain and act as a solvent and/or reaction medium for preparing the dimethyl ester, with the addition of $H_2SO_4$, $NaHSO_4$ or other suitable catalysts. It was found that if the pH was adjusted to above 7.0 during reaction between cyclopentadiene and the monomethyl maleate, the reaction stopped and would not proceed. However, upon readjustment of the pH to below 7, preferably to below 4.3, the reaction was reinitiated and proceeded to completion. The temperature during reaction was found to be slightly above that of room temperature and rose during reaction to about 30° C., thus indicating that the reaction is exothermic.

Example II 200 grams of maleic acid were dissolved in one liter of water producing a solution having a pH value between 0.4 and 0.45. A molar excess of cyclopentadiene was added to the solution whereupon reaction immediately commenced between the maleic acid and the cyclopentadiene, evidenced by the formation of a white precipitate. The product thus formed was a white crystalline product which by melting point and analysis was shown to be bicyclo (2,2,1) 5-heptene 2,3 dicarboxylic acid. The pH initially was about 1.0 but gradually raised as the reaction proceeded to a value of about 4.3, whereupon the reaction was found to be substantially completed. The temperature of reaction was preferably that of room temperature or slightly thereabove, but was not permitted to exceed the boiling point of cyclopentadiene, or 44° C. at ordinary atmospheric pressures.

Example III

To 100 grams of a 20% aqueous maleic acid solution there was added 10 grams of disodium maleate. The pH of this mixture was found to be 0.71. A molar excess of cyclopentadiene was then added. There was formed a white precipitate which settled out of the solution. After reaction the pH was found to be 4.82.

Example IV 10 grams of disodium maleate was dissolved in 50 cc. of water. The pH of the solution was 9.5. A molar excess of cyclopentadiene was added, but it was found that no reaction could be made to take place with the disodium maleate, even after vigorous shaking for two hours. However, upon adding maleic acid to the mixture reaction took place immediately, thus showing that the reaction in Example III took place between the cyclopentadiene and the maleic acid having at least one carboxylic acid group present, and no reaction took place between cyclopentadiene and disodium maleate.

Example V

Sodium bicarbonate was added to a 20% aqueous solution of maleic acid which initially had a pH value of 0.4 to 0.45 producing a solution having a pH value of 1.28. When this solution was reacted with cyclopentadiene the reaction did not take place quite so promptly and there was a lag of about 10 minutes before the reaction was concluded. The final pH value of the solution was 4.16.

The experiment was repeated using sufficient sodium bicarbonate solution to give an initial pH value of 1.8. At the end of 10 minutes the solution became perceptively warmer and had reached a total of 10 degrees at the end of 20 minutes. The reaction was completed at about the end of 1½ hours and the final pH value was 4.28.

When sufficient sodium bicarbonate was added to give an initial pH value of 2.45 the solution had to be shaken for ½ hour before there was appreciable rise in temperature, whereas when the initial pH value was increased to 6 by the addition of sodium bicarbonate there was no rise in temperature and no evidence of reaction after vigorous shaking for ½ hour.

Example VI

To a vessel there was added 500 grams of an aqueous solution of crude maleic acid which had been obtained as a by-product from the oxidation of naphthalene in the preparation of phthalic anhydride. The purpose of this test was to determine the content of maleic acid in the crude solution treated. The pH value of the solution was about 0.75. To this there was added an excess of freshly distilled cyclopentadiene comprising about 75 grams of said diene. The reaction between the maleic acid and the diene took place immediately and was completed rapidly giving a final pH value of 1.8. This low final pH value may have been due to the presence of other organic or inorganic acids which did not take part in the reaction. A tan slurry of crystals formed in the reaction mixture. The reaction was exothermic, and hence the vessel was cooled with ice water during reaction. The crystals were filtered off and dried. The reaction product was found to have a melting point of 172–174° C., as compared with a melting point of 182° C. for the pure acid product. To obtain a purer reaction product the waste liquor was heated to boiling for approximately 15 minutes, filtered, and the filtrate then treated with activated charcoal and again filtered. The product was then reacted with cyclopentadiene and the resultant reaction product was found to be pure white and had a melting point of 182° C. The yield of the reaction product obtained indicated that the total amount of maleic acid in the aqueous solution was 114 grams. In other words the 500 gram sample submitted contained 22.8% maleic acid by weight.

Example VII

To 50 grams of the monomethyl ester of maleic acid dissolved in methyl alcohol there was added 25 grams of butadiene which was in molar excess with respect to the maleic acid. The pH of the solution of monomethyl ester of maleic acid before adding the butadiene was 2.1. The reaction took place between the butadiene and the monomethyl ester of maleic acid in aqueous medium initially at room temperature, but since the reaction is exothermic, the temperature rose as the reaction proceeded. However, it was noted that the rate of the reaction increased considerably when heated under pressure to a temperature of 100° C. in the presence of butadiene. Furthermore, it was found that no reaction would take place between butadiene and monomethyl ester of maleic acid when the pH was above 7.0, or when placed in non-polar type solvent media.

From the above examples it will be seen that reaction between a diene and the unsaturated carboxylic acids of the class described as, for example, maleic acid, homologues or derivatives thereof, will take place only in polar type solvents when the pH is not above 7.0, preferably at a pH of between about 0.1 and 5.0. Regardless of the pH, however, no reaction will take place in hydrocarbon media or other such non-polar type solvents where ionization cannot take place.

The addition products formed as a result of reacting the dienes of the class described with the 1,2 unsaturated organic acids of the class described are useful as intermediary starting materials for forming other valuable chemical compounds having many industrial applications.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A process for reacting conjugated dienes with 1,2 unsaturated aliphatic carboxylic acid which comprises the step of contacting the reactants in the presence of a polar solvent for a period not exceeding about 90 minutes while maintaining the pH value of the reaction mixture below 7.

2. A process for reacting conjugated dienes with 1,2 unsaturated aliphatic carboxylic acid which comprises the step of contacting the reactants in the presence of a polar solvent for a period not exceeding about 90 minutes while maintaining the pH value of said medium between about 0.1 and 5.0.

3. A process for reacting conjugated dienes with maleic acid which comprises the step of contacting the reactants in the presence of a polar solvent for a period not exceeding about 90 minutes while maintaining the pH value of the reaction mixture below 7.

4. A process for reacting conjugated dienes with maleic acid which comprises the step of contacting the reactants in the presence of an aqueous medium for a period not exceeding about 90 minutes while maintaining the pH value of said medium below 7.

5. A process for reacting conjugated dienes with maleic acid which comprises the step of contacting the reactants in the presence of an aqueous medium for a period not exceeding about 90 minutes while maintaining the pH value of said medium between about 0.1 and 5.0.

6. A method for reacting an aliphatic diene with a 1,2 unsaturated carboxylic acid which comprises the step of contacting the reactants in an aqueous medium for a period not exceeding about 90 minutes while maintaining the pH value of the medium below 7.

7. A method for reacting an aliphatic diene with a 1,2 unsaturated aliphatic carboxylic acid which comprises the step of contacting the reactants in an aqueous medium for a period not exceeding about 90 minutes while maintaining the value of the medium between about 0.1 and 5.0.

8. A method for reacting an aliphatic diene with maleic acid which comprises the step of contacting the reactants in an aqueous medium for a period not exceeding about 90 minutes while maintaining the pH value of the medium below 7.

9. A method for reacting an aliphatic diene with maleic acid which comprises the step of contacting the reactants in an aqueous medium for a period not exceeding about 90 minutes while maintaining the pH value of the medium between 0.1 and 5.0.

10. A method for reacting cyclopentadiene with a 1,2 unsaturated aliphatic carboxylic acid which comprises the step of contacting the reactants in an aqueous medium for a period not exceeding about 90 minutes while maintaining the pH value of the medium below 7.

11. A method for reacting cyclopentadiene with a 1,2 unsaturated aliphatic carboxylic acid which comprises the step of contacting the reactants in an aqueous medium for a period not exceeding about 90 minutes while maintaining the pH value of the medium between about 0.1 and 5.0.

12. A method for reacting cyclopentadiene with maleic acid which comprises the step of contacting the reactants in an aqueous medium for a period not exceeding about 90 minutes while maintaining the pH value of the medium below 7.

13. A method for reacting cyclopentadiene with maleic acid which comprises the step of contacting the reactants in an aqueous medium for a period not exceeding about 90 minutes while maintaining the pH value of the medium between about 0.1 and 5.0.

14. The process comprising adding cyclopentadiene to an aqueous solution of maleic acid having a pH numerically not greater than 5.0 maintaining the reactants in contact for a period not exceeding about 90 minutes thus forming a water insoluble condensation product of said maleic acid and cyclopentadiene and separating said insoluble product from the reaction mixture.

FRANK J. SOWA.
ARTHUR SCHWERDLE.

REFERENCES CITED

The following references are of record in the file of this patent:

UNITED STATES PATENTS

| Number | Name | Date |
|---|---|---|
| 1,994,731 | Diels et al. | Jan. 23, 1934 |
| 2,262,002 | Hopff et al. | Nov. 11, 1941 |
| 2,275,385 | Soday | Mar. 3, 1942 |

FOREIGN PATENTS

| Number | Country | Date |
|---|---|---|
| 300,130 | Great Britain | Mar. 5, 1930 |